(12) United States Patent
Imanari

(10) Patent No.: US 9,715,229 B2
(45) Date of Patent: Jul. 25, 2017

(54) POWER EQUALIZATION DEVICE

(75) Inventor: Hiroyuki Imanari, Tokyo (JP)

(73) Assignee: TOSHIBA MITSUBISHI-ELECTRIC INDUSTRIAL SYSTEMS CORPORATION, Tokyo (JP)

( * ) Notice: Subject to any disclaimer, the term of this patent is extended or adjusted under 35 U.S.C. 154(b) by 497 days.

(21) Appl. No.: 14/371,774

(22) PCT Filed: Feb. 14, 2012

(86) PCT No.: PCT/JP2012/053326
§ 371 (c)(1),
(2), (4) Date: Jul. 11, 2014

(87) PCT Pub. No.: WO2013/121514
PCT Pub. Date: Aug. 22, 2013

(65) Prior Publication Data
US 2015/0051745 A1 Feb. 19, 2015

(51) Int. Cl.
*G05B 19/418* (2006.01)
*H02J 3/32* (2006.01)
(Continued)

(52) U.S. Cl.
CPC ......... *G05B 19/418* (2013.01); *G05B 13/026* (2013.01); *G05B 15/02* (2013.01);
(Continued)

(58) Field of Classification Search
None
See application file for complete search history.

(56) References Cited

U.S. PATENT DOCUMENTS

2005/0015283 A1* 1/2005 Iino .................. G06Q 10/06315
705/4
2010/0262312 A1* 10/2010 Kubota ............... H01M 10/425
700/295
(Continued)

FOREIGN PATENT DOCUMENTS

JP 6-284572 A 10/1994
JP 11-221739 8/1999
(Continued)

OTHER PUBLICATIONS

Office Action issued Oct. 11, 2016 in Chinese Patent Application No. 201280069768.3 (with partial English language translation).
(Continued)

*Primary Examiner* — Tuan Dao
(74) *Attorney, Agent, or Firm* — Oblon, McClelland, Maier & Neustadt, L.L.P.

(57) ABSTRACT

Provided is a power equalization device capable of equalizing the power supplied to a manufacturing line from outside even in the case where a plurality of materials are simultaneously processed at different locations. For this purpose, the power equalization device has a power demand prediction function of predicting power consumption expected when a plurality of materials are simultaneously processed at different locations of a manufacturing plant or manufacturing line of a metallic material, and a power equalization control function of causing a power storage device to make the manufacturing plant or the manufacturing line perform discharging in the case where power consumption predicted by the power demand prediction function exceeds a prescribed value, so that power supplied to the manufacturing plant or the manufacturing line from an external power system becomes not more than the prescribed value.

17 Claims, 13 Drawing Sheets

(51) Int. Cl.
  *H02J 3/30* (2006.01)
  *G05B 13/02* (2006.01)
  *G05B 15/02* (2006.01)
  *H02J 3/00* (2006.01)

(52) U.S. Cl.
  CPC *H02J 3/30* (2013.01); *H02J 3/32* (2013.01); *G05B 2219/2639* (2013.01); *H02J 2003/003* (2013.01); *Y02E 60/16* (2013.01); *Y04S 10/54* (2013.01)

(56) References Cited

U.S. PATENT DOCUMENTS

| 2012/0109392 | A1* | 5/2012 | Hanks | H02J 3/008 700/291 |
| 2012/0239214 | A1* | 9/2012 | Nakashima | H02J 3/32 700/291 |
| 2012/0245744 | A1* | 9/2012 | Prosser | H02J 3/46 700/286 |

FOREIGN PATENT DOCUMENTS

| JP | 11-275762 A | 10/1999 |
| JP | 2000-102174 | 4/2000 |
| JP | 2002-165362 A | 6/2002 |
| JP | 2004-129322 | 4/2004 |
| JP | 2005-92827 A | 4/2005 |
| JP | 2006-178893 | 7/2006 |
| JP | 2008-148505 | 6/2008 |
| JP | 2009-183077 | 8/2009 |
| JP | 2011-188559 | 9/2011 |
| JP | 2011-229238 A | 11/2011 |

OTHER PUBLICATIONS

Office Action issued on Nov. 10, 2015 in Japanese Patent Application No. 2013-558606 with partial English translation.
Korean Office Action issued Jan. 6, 2016 in Patent Application No. 10-2014-7019134 (with Partial English Translation).
English translation of the International Preliminary Report on Patentability and Written Opinion issued Aug. 28, 2014, in PCT/JP2012/053326 filed Feb. 14, 2012.
Combined Chinese Office Action and Search Report issued Feb. 14, 2016 in Patent Application No. 201280069768.3 (with partial English language translation and English translation of categories of cited documents).
Office Action issued Mar. 3, 2015 in Japanese Patent Application No. 2013-558606.
International Search Report issued May 1, 2012, in PCT/JP12/053326 filed Feb. 14, 2012.
Office Action issued Jul. 5, 2016 in Korean Patent Application No. 10-2014-7019134 (with partial English translation of the Office Action).

\* cited by examiner

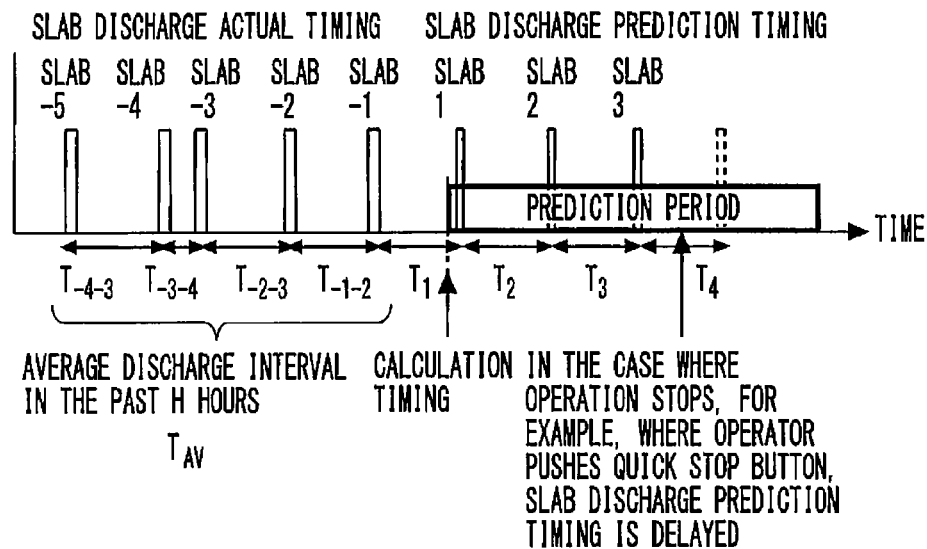

ELECTRIC ENERGY $E = \int P_w dt = \int (Torque \times Speed) dt$

REPEAT THE PROCESSING FROM START TO END.

POWER EQUALIZATION DEVICE

TECHNICAL FIELD

The present invention relates to a power equalization device which equalizes the power supplied to a manufacturing plant or a manufacturing line from outside.

BACKGROUND ART

As a power control method for a manufacturing line, there has been proposed a method by which power is generated by private power generation and the like when the maximum demand power of a manufacturing line is expected to exceed contract demand (refer to Patent Literature 1, for example).

CITATION LIST

Patent Literature

Patent Literature 1: Japanese Patent Laid-Open No. 2009-183077

SUMMARY OF INVENTION

Technical Problem

However, in the above-described power control method, no consideration is given to the case where a plurality of materials are simultaneously processed at different locations of a manufacturing line. For this reason, it is impossible to equalize the power supplied to the manufacturing line from outside.

The present invention was made in order to solve the above-described problem, and the object of the present invention is to provide a power equalization device capable of equalizing the power supplied to a manufacturing line from outside even in the case where a plurality of materials are simultaneously processed at different locations of the manufacturing line.

Means for Solving the Problems

A power equalization device of the present invention includes a power demand prediction function of predicting power consumption expected when a plurality of materials are processed at different locations of a manufacturing plant or manufacturing line of a metallic material and a power equalization control function of causing a power storage device to make the manufacturing plant or the manufacturing line perform discharging in the case where power consumption predicted by the power demand prediction function exceeds a prescribed value, so that power supplied to the manufacturing plant or the manufacturing line from an external power system becomes not more than the prescribed value.

A power equalization device of the present invention includes a power demand prediction function of predicting power consumption expected when a plurality of materials are processed at different locations of a manufacturing plant or manufacturing line of a metallic material and a power equalization control function of adjusting the manufacturing timing of a product in the manufacturing plant or the manufacturing line in the case where the power consumption predicted by the power prediction demand function exceeds a prescribed value, so that power supplied to the manufacturing plant or the manufacturing line from an external power system becomes not more than the prescribed value.

Advantageous Effect of Invention

According to the present invention, it is possible to equalize the power supplied to a manufacturing line from outside even in the case where a plurality of materials are simultaneously processed at different locations.

BRIEF DESCRIPTION OF THE DRAWINGS

FIG. 2 is a diagram to explain the operation schedule prediction function of the power equalization device in Embodiment 1 of the present invention.

FIG. 3 is a diagram to explain the learning function of the operation schedule prediction function of the power equalization device in Embodiment 1 of the present invention.

DESCRIPTION OF EMBODIMENTS

Embodiments of the present invention will be described with reference to the accompanying drawings. In each of the drawings, identical numerals refer to identical or corresponding parts and overlaps of description of these parts are appropriately simplified or omitted.

Embodiment 1

Figure 1:
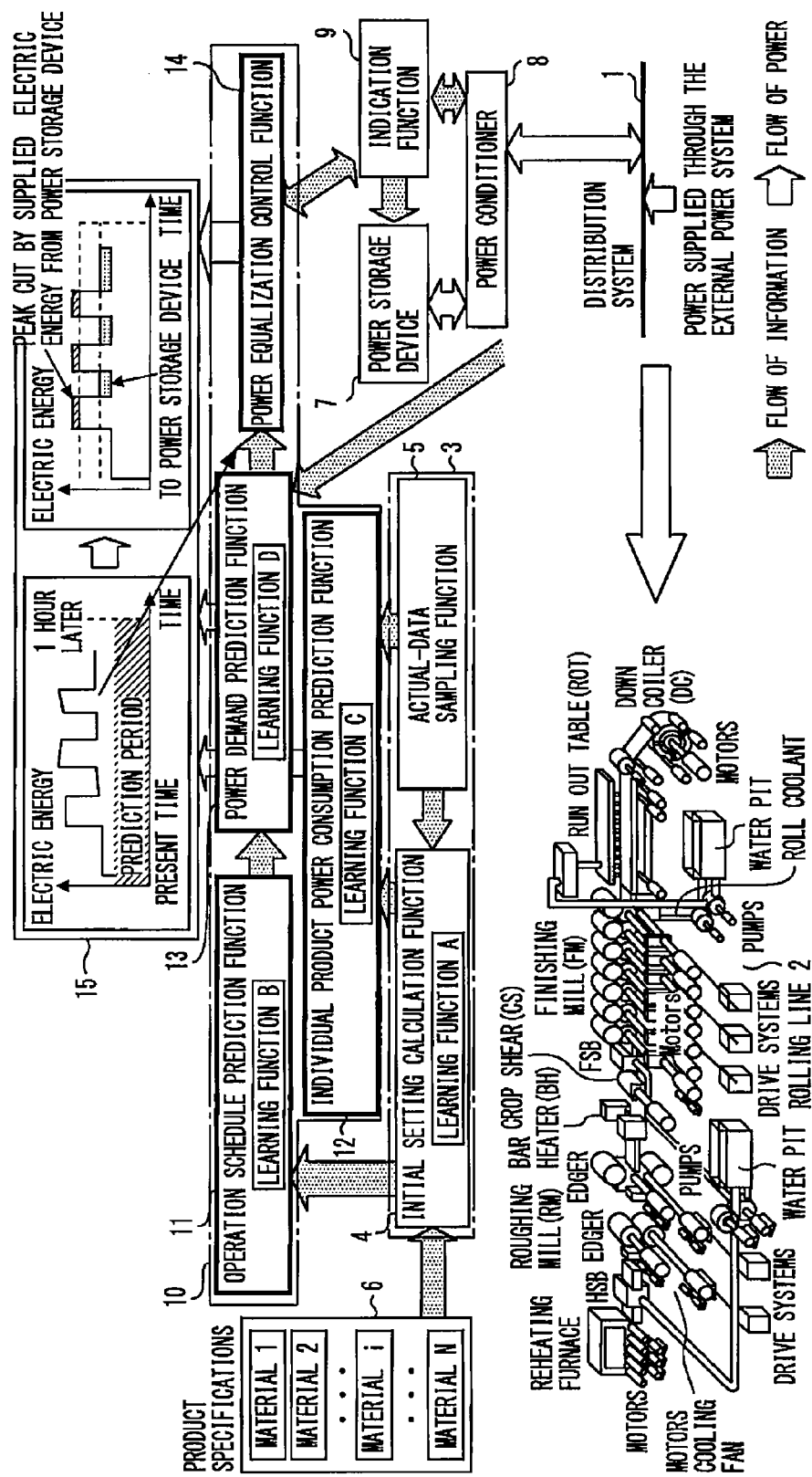
FIG. 1 is a block diagram of a power equalization device in Embodiment 1 of the present invention.

FIG. 1 is a block diagram of a power equalization device in Embodiment 1 of the present invention.

In FIG. 1, reference numeral 1 denotes a distribution system. An external power system is connected to the input side of the distribution system 1. A rolling line 2 is connected to the output side of the distribution system 1. The rolling line 2 is a hot strip mill.

A reheating furnace is provided on the uppermost stream side of the rolling line 2. A roughing mill is provided on the downstream side of the reheating furnace. A finishing mill is provided on the downstream side of the roughing mill. A coiler is provided on the downstream side of the finishing mill.

Reference numeral 3 denotes the control system of the rolling line 2. The control system 3 has an initial setting calculation function 4 and an actual-data sampling function 5. The initial setting calculation function 4 has a learning function A.

Reference numeral 6 denotes product specifications. The product specifications 6 are material information, specifications of products to be manufactured in the rolling line 2, and the like. The product specifications 6 are given by a host computer for each material.

In manufacturing a desired product, the initial setting calculation function 4 calculates initial setting of the rolling line 2 on the basis of the product specifications 6. The setting of the reheating furnace, the roughing mill, the finishing mill and the like is performed on the basis of this initial setting. The roughing mill, the finishing mill and the like go into action on the basis of the setting using the power supplied through the external power system via the distribution system 1. In the reheating furnace, on the basis of this setting, control is performed using the supplied power and a fuel is appropriately combusted, whereby the temperature of a material to be rolled is raised to a desired temperature. Specifically, a slab is discharged from the reheating furnace as a material to be rolled. This material to be rolled is rolled on the roughing mill and the finishing mill. After that, the rolled material is wound on a coiler. On this occasion, the actual-data sampling function 5 collects rolling actual data of the rolling line 2.

At this time, when the material to be rolled enters the roughing mill, the control system 3 controls the total length of the rolled material. Specifically, the initial setting calculation function 4 predicts time information as to for how many seconds rolling and transfer are performed in each facility after the start of rolling. On the basis of this prediction and rolling actual data, the learning function A learns models used in calculating the setting of the reheating furnace, the roughing mill, the finishing mill and the like. On the basis of results of this learning, the initial setting calculation function 4 corrects the setting of the reheating furnace, the roughing mill, the finishing mill and the like.

In this embodiment, a power storage device 7 is provided. The power storage device 7 is provided with a storage battery, a flywheel, and a large-capacity capacitor.

The storage battery stores electrical energy as chemical energy. For this reason, rapid discharging of the storage battery is difficult. However, if a lithium-ion cell and the like are used, rapid discharging is performed. On the other hand, if an NaS cell (a cell in which sodium and sulfur are used), for example, is used, it is easy to increase the capacity of the storage battery. The prices of storage batteries have recently fallen greatly. For this reason, a storage battery capacity increase is realised easily and inexpensively.

The flywheel is an electrical storage device in which the flywheel effect is used. In the flywheel, a rotary body and a motor-generator are directly connected. The rotary body has a large inertia. In charging, the number of revolutions of the rotary body is increased by supplying power to the motor-generator. In this case, the motor-generator is used as an electric motor. In discharging, the motor-generator is used as a generator, whereby the number of revolutions of the rotary body is decreased. The storage capacity of the flywheel is determined by the scale of the rotary body and the motor-generator. The discharge speed of the flywheel is equal to or higher than the discharge speed of a storage battery capable of rapid discharging.

The large-capacity capacitor stores electrical energy without converting the electrical energy into another type of energy. For this reason, the discharge speed of the large-capacity capacitor is faster than the discharge speed of the storage battery and the discharge speed of the flywheel. In contrast to this, there is a limit to the storage capacity of the large-capacity capacitor. It has recently been possible to increase the storage capacity of the large-capacity capacitor by frequently using an electric double-layer capacitor and the like.

In the power storage device 7, the storage battery, the flywheel, and the large-capacity capacitor are properly used so that these complement each other according to the speed response of the power to be discharged. For example, in the case where a rapid and large-amount discharge is necessary, first, the large-capacity capacitor capable of rapid discharging performs discharging. After that, the flywheel is used. Lastly, the storage battery, which has slow response, is used. The same effect is expected from each of the combinations of the large-capacity capacitor and the storage battery, the flywheel and the storage battery, and the large-capacity capacitor and the flywheel.

A power conditioner 8 is connected to between the distribution system 1 and the power storage device 7. The power conditioner 8 has a function of appropriately converting an alternate current, which is supplied from an external power system in charging the power storage device 7, into a direct current. The power conditioner 8 has a function of appropriately converting direct-current power discharged by the power storage device 7 into alternating-current power.

A power storage device control function 9 is connected to the power storage device 7 and the power conditioner 8. The power storage device control function 9 has a function of controlling the power storage device 7 and the power conditioner 8 so that the power storage device 7 performs charging and discharging appropriately.

Reference numeral 10 denotes a power equalization device. The power equalization device 10 has an operation schedule prediction function 11, an individual-product power consumption prediction function 12, a power demand prediction function 13, a power equalization control function 14, and an indication function 15.

The operation schedule prediction function 11 has a function of predicting the timing of slabs 1, 2, . . . N, which are materials planned in the product specifications 6, at which the slabs are discharged from the reheating furnace, and predicting at which timing and in which location these rolled materials are present on the basis of the rolling and transfer time in each facility calculated in the initial setting calculation function 4. The operation schedule prediction function 11 has a learning function B. The learning function B has a function of correcting the prediction of the slab discharge timing on the basis of actual data.

Regardless of the timing predicted in the operation schedule prediction function 11, the individual-product power consumption prediction function 12 has a function of calculating the power consumed in each facility of the rolling line 2 during the period in which the materials 1, 2, ... N planned in the product specifications 6 become products from slabs on the basis of the settings of the reheating furnace, the roughing mill, the finishing mill and the like calculated in the initial setting calculation function 4. The individual-product power consumption prediction function 12 has a learning function C. The learning function C has the function of correcting the calculation of power consumption on the basis of actual data.

The power demand prediction function 13 has a function of calculating power consumption in a prescribed prediction period in a time-series manner on the basis of the location information and time information of rolled materials predicted in the operation schedule prediction function 11 and power consumption for each rolled material calculated in the individual-product power consumption prediction function 12. The power demand prediction function 13 has a learning function D. The learning function D has the function of correcting the calculation of power consumption on the basis of actual data.

The power equalization control function 14 has a function of giving a discharge instruction for the power storage device 7 to the power storage device control function 9 in the case where the power consumption calculated in the power demand prediction function 13 exceeds a prescribed peak value, so that the power supplied from an external power system to the rolling line 2 becomes not more than the peak value. The power equalization control function 14 has a function of giving a charge instruction for the power storage device 7 to the power storage device control function 9 in the case where the power consumption calculated in the power demand prediction function 13 does not exceed a peak value. The power equalization control function 14 is provided with power monitor control means. The power monitor control means has a function of monitoring actual data on power consumption which changes every moment and causing the power storage device 7 to discharge forcedly in the case where the actual data of power consumption has exceeded a power threshold value. A power threshold value is set at a peak value or a value which is smaller than the peak value by an allowance.

The indication function 15 has a function of causing a display and the like of a computer to indicate time series of the power consumption calculated in the power demand prediction function 13 and time series of the power consumption equalized in the power equalization control function 14. Examples of the time series of the power consumption calculated in the power demand prediction function 13 are shown on the left side of the indication function 15. Examples of time series of the power consumption equalized in the power equalization control function 14 are shown on the right side of the indication function 15.

Next, a prediction method of slab discharge timing by the operation schedule prediction function 11 will be described with the aid of FIG. 2.

FIG. 2 is a diagram to explain the operation schedule prediction function of the power equalization device in Embodiment 1 of the present invention.

In FIG. 2, an average value $T_{AV}$ of slab discharge intervals in a past fixed period satisfies the relationships of Formula (1) and Formula (2) below.

Expression (1)

$$T_{AV} = \frac{1}{N_P}\left(\sum_{i=-1}^{-NP+1} T_{i,i-1}\right) \quad (1)$$

Expression (2)

$$T_{AV}^{LL} \leq T_{AV} \leq T_{AV}^{UL} \quad (2)$$

Where, $N_P$ is the number of slabs discharged in a past fixed period. $T_{i,i-1}$ is the time interval of slab No. i and slab No. i−1. For example, No.-2 refers to a slab just behind the slab which was discharged last, counting from the present time. $T_{AV}^{LL}$ is a lower limit value of $T_{AV}$. $T_{AV}^{UL}$ is an upper limit value of $T_{AV}$.

If the present time is denoted by t0 and the number of slabs in a prediction period is denoted by $N_F$, then the slab discharge timing $t_j$ is calculated by Formula (3) below.

Expression (3)

$$t_1 = t_0 + T_1, \ T_1 = T_{AV},$$

$$t_2 = t_1 + T_2, \ T_2 = T_{AV},$$

$$t_3 = t_2 + T_3, \ T_3 = T_{AV}, \ldots,$$

$$t_{NF} = t_{NF-1} + T_{NF}, \ T_{NF} = T_{AV}. \quad (3)$$

Also there is a case where the slab discharge timing $t_j$ is predicted by performing first-order lag filtering of past slab discharge intervals. In this case, the filtering value $T_{FL}$ of past slab discharge intervals satisfies Formula (4) and Formula (5) below.

Expression (4)

$$T_{FL\_i,i-1} = \alpha_2 T_{i,i-1} + (1-\alpha_2) T_{FL\_i-1,i-2} \quad (4)$$

Expression (5)

$$T_{FL}^{LL} \leq T_{FL} \leq T_{FL}^{UL} \quad (5)$$

Where, $\alpha_2$ is a filtering gain. $T_{FL}^{LL}$ is a lower limit value of $T_{FL}$. $T_{FL}^{UL}$ is an upper limit value of $T_{FL}$. In this case, the slab discharge timing $t_j$ is calculated by Formula (6) below.

Expression (6)

$$t_1 = t_0 + T_1, \ T_1 = T_{-1,-2}^{FL},$$

$$t_2 = t_1 + T_2, \ T_2 = T_{-1,-2}^{FL},$$

$$t_3 = t_2 + T_3, \ T_3 = T_{-1,-2}^{FL}, \ldots,$$

$$t_{NF} = t_{NF-1} + T_{NF}, \ T_{NF} = T_{-1,-2}^{FL}. \quad (6)$$

In the case where an operator pushes a quick stop button, time required by settling a trouble (minute) is inputted. On this occasion, the prediction of the discharge timing of the next slab is delayed by the inputted time (minute). In the case where an operator specifies the slab discharge timing, that timing is taken into consideration.

Next, with the aid of FIG. 3 a description will be given of a method of correcting the prediction of the slab discharge timing by the learning function B.

FIG. 3 is a diagram to explain the learning function of the operation schedule prediction function of the power equalization device in Embodiment 1 of the present invention.

As shown in FIG. 3, the learning function B classifies tables by steel grade, target finish strip thickness, target finish strip width and the like, and stores slab discharge time intervals in appropriate table segments. A value which is stored is leveled by Formula (7) below.

(Slab discharge time interval to be newly stored
$T_{new}$)=$G$*(actual value of slab discharge time interval $T$)+(1−$G$)*(slab discharge time interval stored in table $T_{old}$) (7)

Where, G is a weighting factor in the range of 0≤G≤1.

A description will be given of the case where, for example, in the prediction of the slab discharge timing $t_j$ using Formula (3), a change is made at timing t3 from a slab corresponding to steel grade i, target finish strip thickness j, and target finish strip width k to a slab corresponding to steel grade l, target finish strip thickness m, and target finish strip width n. In this case, the slab discharge timing $t_j$ is calculated by Formula (8) below.

Expression (7)

$t_1 = t_0 + T_1$, $T_1 = T_{AV}$, $t_2 = t_1 + T_2$, $T_2 = T_{AV}$, $t_3 = t_2 + T_3$, $T_3 = T_{AV} + \alpha_4(T_{l,m,n}^{STORED} - T_{i,j,k}^{STORED})$, ...

$t_{NF} = t_{NF-1} + T_{NF}$, $T_{NF} = T_{AV}$. (8)

Where, $\alpha_4$ is a weighting gain at the time of lot change.

Next, with the aid of FIG. 4 a description will be given of a method of calculating power consumption by the individual-product power consumption prediction function 12.

Figure 4:
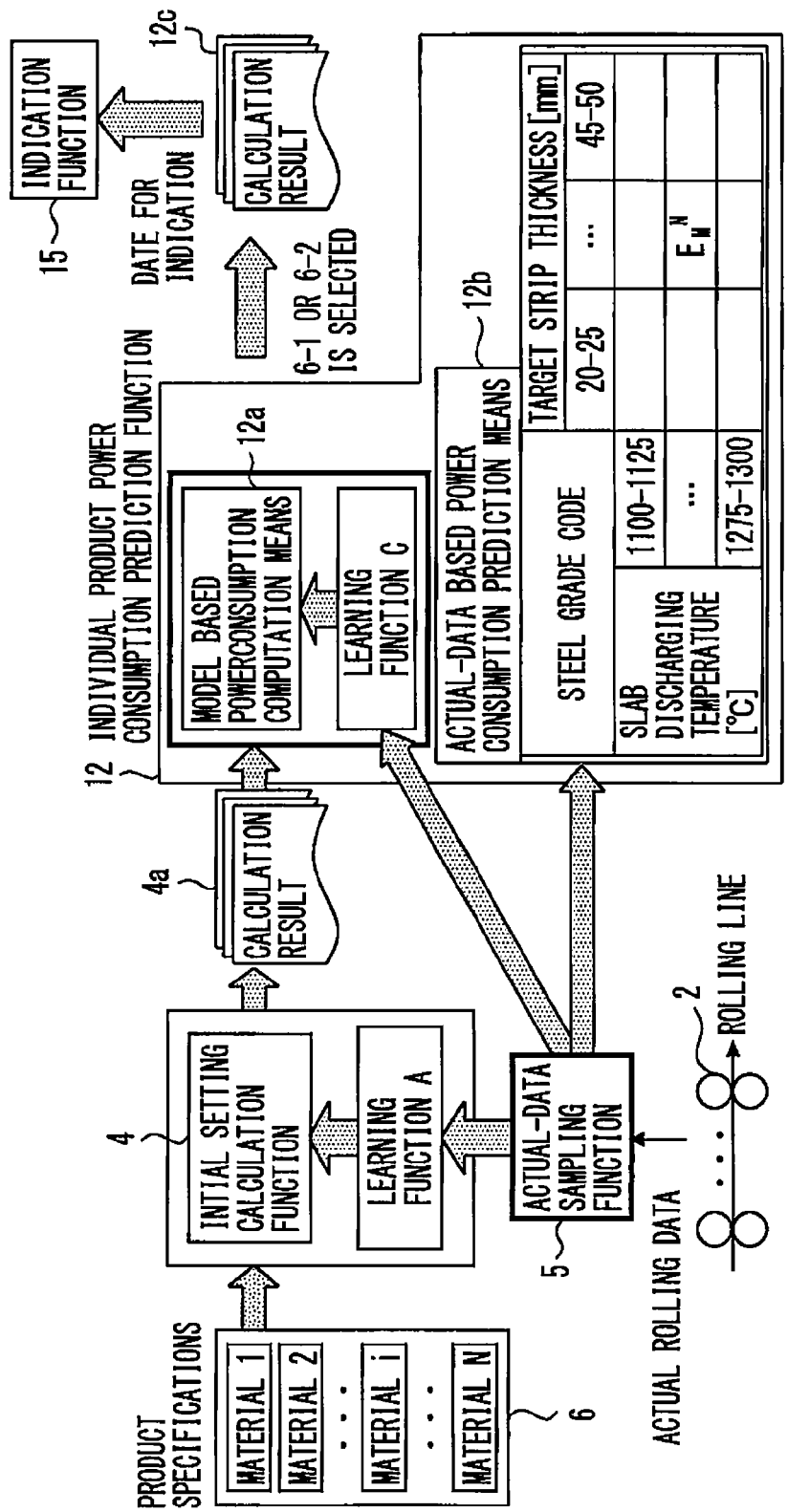
FIG. 4 is a diagram to explain the individual-product power consumption prediction function of the power equalization device in Embodiment of the present invention.

FIG. 4 is a diagram to explain the individual-product power consumption prediction function of the power equalization device in Embodiment of the present invention.

As shown in FIG. 4, the individual-product power consumption prediction function 12 has model based power consumption computation means 12a and actual-data based power consumption prediction means 12b. The model based power consumption computation means 12a has a function of calculating power consumption expected during the manufacture of a rolled material which is an object of calculation on the basis of calculation results 4a calculated in the initial setting function calculation function. The actual-data based power consumption prediction means 12b has a function of calculating power consumption expected during the manufacture of a rolled material which is an object of calculation on the basis of actual data. The individual-product power consumption prediction function 12 has a function of outputting calculation results 12c of either the model based power consumption computation means 12a or the actual-data based power consumption prediction means 12b.

Next, with the aid of FIG. 5 a description will be given of a method of calculating power consumption by the model based power consumption computation means 12a.

Figures 5, 6:
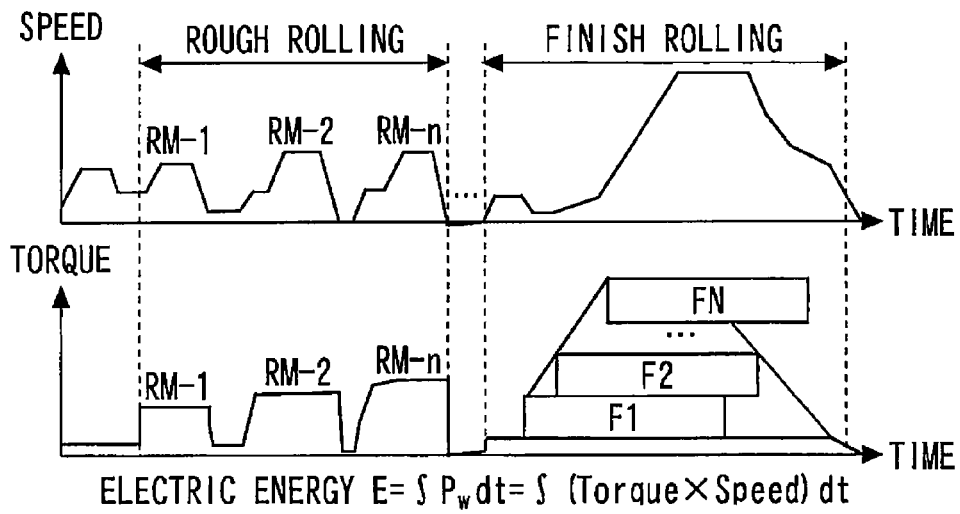
FIG. 5 is a diagram to explain the model based power consumption computation means of the power equalization device in Embodiment 1 of the present invention.
FIG. 6 is a diagram to explain the learning function of the model based power consumption computation means of the power equalization device in Embodiment 1 of the present invention.

FIG. 5 is a diagram to explain the model based power consumption computation means of the power equalization device in Embodiment 1 of the present invention.

The upper part of FIG. 5 shows the speed predicted by the initial setting calculation function 4. The lower part of FIG. 5 shows the torque predicted by the initial setting calculation function 4.

The model based power consumption computation means 12a calculates power consumption on the basis of the torque and speed predicted in the initial setting calculation function 4. Specifically, the model based power consumption computation means 12a calculates a product of torque and speed at each time as the power consumption at this time in question. In this case, the electric energy of a rolled material which is an object of calculation becomes an integral value of power within rolling time.

Next, with the aid of FIG. 6 a description will be given of a method of correcting the calculation of power consumption by the learning function C.

FIG. 6 is a diagram to explain the learning function of the model based power consumption computation means of the power equalization device in Embodiment 1 of the present invention.

A calculated value of power by the model based power consumption computation means 12a is a predicted value. This predicted value involves errors. Therefore, after the rolling of a rolled material, the learning function C calculates a learned value Z by collecting actual data on power consumption and comparing the actual data with a calculated value. As a result, the accuracy of next calculation increases. A learned value Z is calculated by Formula (9) below.

(Learned value $Z$)=(actual value of power consumption)/(predicted value of power consumption) (9)

As shown in FIG. 6, learned values Z are stored in tables classified by parameters related to power consumption, such as steel grade and slab discharge temperature. On this occasion, leveling is performed for the purpose of filtering. Specifically, a learned value $Z_{new}$ to be used next time is calculated by Formula (10) below using a learned value $Z_{old}$ which is stored in the same table segment and Formula (9).

(Learned value $Z_{new}$)=$K$*(learned value $Z$)+(1−$K$)*(learned value $Z_{old}$) (10)

Where, K is a learning gain in the range of 0≤K≤1.

The learned value $Z_{new}$ is overwritten in the table segment in question. In the next calculation, the predicted value of power consumption is corrected using Formula (11) below through the use of the $Z_{new}$ of the table segment in question.

(Predicted value of power consumption)=(predicted value of power consumption not including learned value)*(learned value $Z_{new}$) (11)

The same applies also to the learning calculation by the learning function A of the initial setting calculation function 4.

Next, with the aid of FIG. 7 a description will be given of a method of calculating power consumption by the actual-data based power consumption prediction means 12b.

Figures 7, 8:
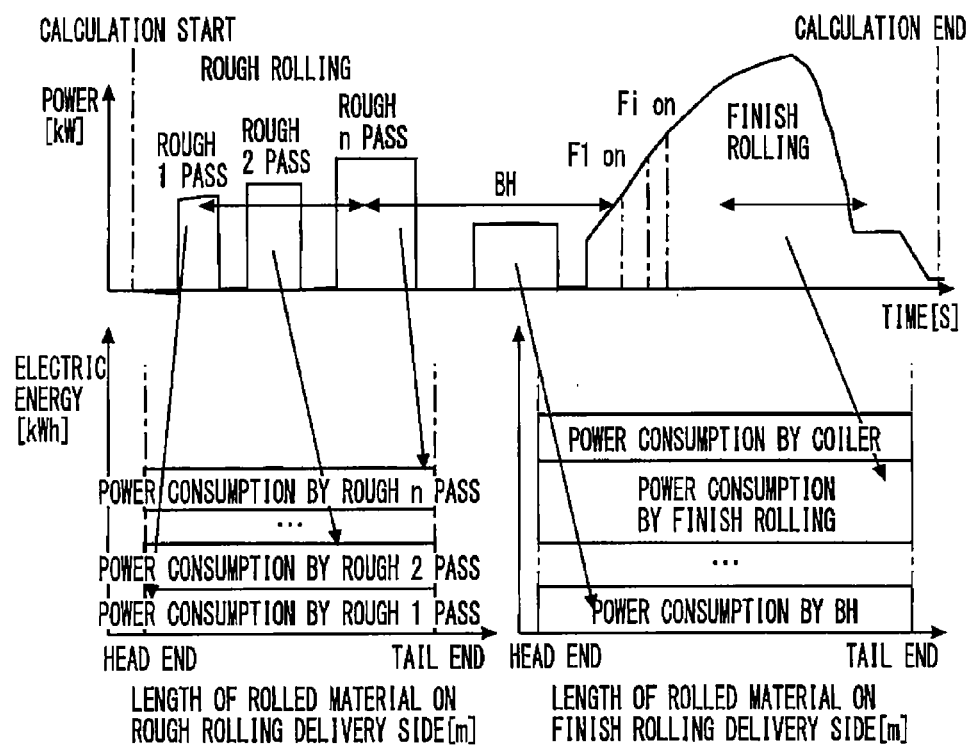
FIG. 7 is a diagram to explain the actual-data based power consumption prediction means of the power equalization device in Embodiment 1 of the present invention.
FIG. 8 is a diagram to explain tables of the actual-data based power consumption prediction means of the power equalization device in Embodiment 1 of the present invention.

FIG. 7 is a diagram to explain the actual-data based power consumption prediction means of the power equalization device in Embodiment 1 of the present invention.

In the actual-data based power consumption prediction means 12b, actual values of power used in rolling are stored in the data base and table of a computer each time the rolling of a rolled material is finished. In this embodiment, a boundary is provided between rough rolling and finish rolling. Actual data on electric energy on the upstream side and downstream side from this boundary is each stored. On this occasion, the width of a rolled material is substantially proportional to the magnitude of power consumption. For this reason, actual data on electric energy is stored by standardising widths of rolled materials. As a result of this standardization, a universal quantity of electric energy is stored for widths of rolled materials. In the case where this value is used in a rolled material which is an object of calculation, it is necessary only that this value be multiplied by the width of the rolled material in question.

The rolling time changes depending on the speed of each process, such as the rough rolling and finish rolling processes. Electric energy required by each of rough rolling and finish rolling is stored, with the length of a rolled material in a final pass of rough rolling and a final pass of finish rolling as a standard. That is, electric energy is standardised with no consideration given to the time and speed which have effect on energy.

As shown in the upper part of FIG. 7, the abscissa of the power data sampled from the actual-data sampling function 5 is time. For this reason, as shown in the lower part of FIG. 7, it is necessary to covert this data into data on electric energy, with the length of a rolled material as abscissa. Specifically, electric energy is accumulated for each facility of the rolling line 2 and for each pass in the facility, and overall electric energy of a rolled material is calculated. Electric energy per unit length and width of a rolled material is found by dividing this overall electric energy by the length and width of a rolled material.

On this occasion, the electric energy per unit length and width of a rolled material in rough rolling $E_M^{N\_RM}$ is calculated by Formula (12) below.

Expression (12)

$$E_M^{N\_RM} = \frac{E_C^{RM}}{L_C^{RMD} \cdot B_C^{RMD}} \quad (12)$$

Where, $E_C^{RM}$ is power consumption in rough rolling (kWh). $L_C^{RMD}$ is the length (m) of a rolled material on the rough rolling delivery side. $B_C^{RMD}$ is the width (m) of a rolled material on the rough rolling delivery side. $B_C^{RMD}$ may be an average of the width of a slab and the finished width of a rolled material.

The electric energy per unit length and width of a rolled material in finish rolling $E_M^{N\_FM}$ is calculated by Formula (13) below.

Expression (13)

$$E_M^{N\_FM} = \frac{E_C^{FM}}{L_C^{FMD} \cdot B_C^{FMD}} \quad (13)$$

Where, $E_C^{FM}$ is power consumption in rough rolling (kWh). $L_C^{FMD}$ is the length (m) of a rolled material on the rough rolling delivery side. $B_C^{FMD}$ is the width (m) of a rolled material on the rough rolling delivery side. $B_C^{FMD}$ may be an average of the width of a slab and the finished width of a rolled material.

Next, with the aid of FIG. 8 a description will be given of tables of the actual-data based power consumption prediction means 12b.

FIG. 8 is a diagram to explain tables of the actual-data based power consumption prediction means of the power equalization device in Embodiment 1 of the present invention.

As shown in FIG. 8, data sorting is performed by using factors having an effect on power consumption as parameters. Example of parameters include slab discharge temperature, steel grade, rough bar thickness, and target product thickness. The electric energy per unit length and width of a rolled material $E_M^{N\_RM}$, $E_M^{N\_FM}$ are stored in rough rolling and finish rolling tables prepared beforehand.

Next, with the aid of FIG. 9 a description will be given of a method of predicting power consumption by the power demand prediction function 13.

Figure 9:
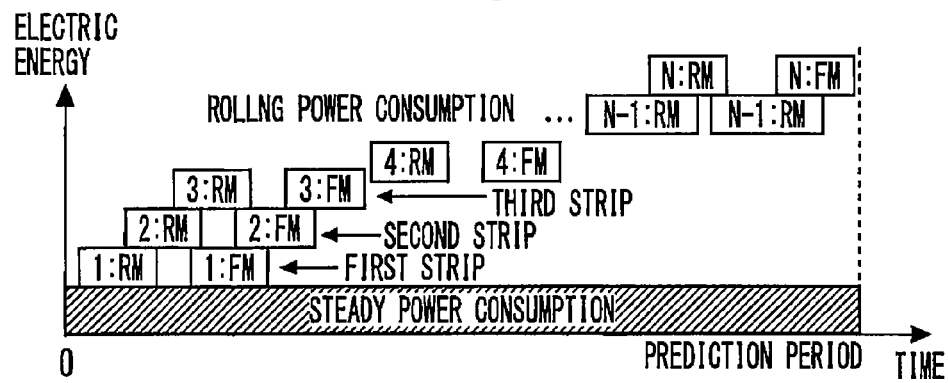
FIG. 9 is a diagram to explain the power demand prediction function of the power equalization device in Embodiment 1 of the present invention.

FIG. 9 is a diagram to explain the power demand prediction function of the power equalization device in Embodiment 1 of the present invention.

Power consumed for each rolled material is calculated in the individual-product power consumption prediction function 12. Information on the location and time of a rolled material is calculated by the operation schedule prediction function 11. For this reason, as shown in the upper part of FIG. 9, the power consumption and time required by rolling are arranged on a virtual graph. Here, steady power consumption is the power consumption of facilities which are located outside the rolling line 2 and constantly consume power, such as pumps for the circulation of cooling water, illumination and air conditioner used in rolling. The total power consumption of these facilities is accurately found by actual measurements. If the arrangement of the upper part of FIG. 9 is completed, as shown in the lower part of FIG. 9, power consumption expected when a plurality of rolled materials are simultaneously rolled at different locations is predicted by accumulating the power at each time.

Next, with the aid of FIG. 10 a description will be given of a method of correcting the prediction of power consumption by the learning function D of the power demand prediction function 13.

Figure 10:
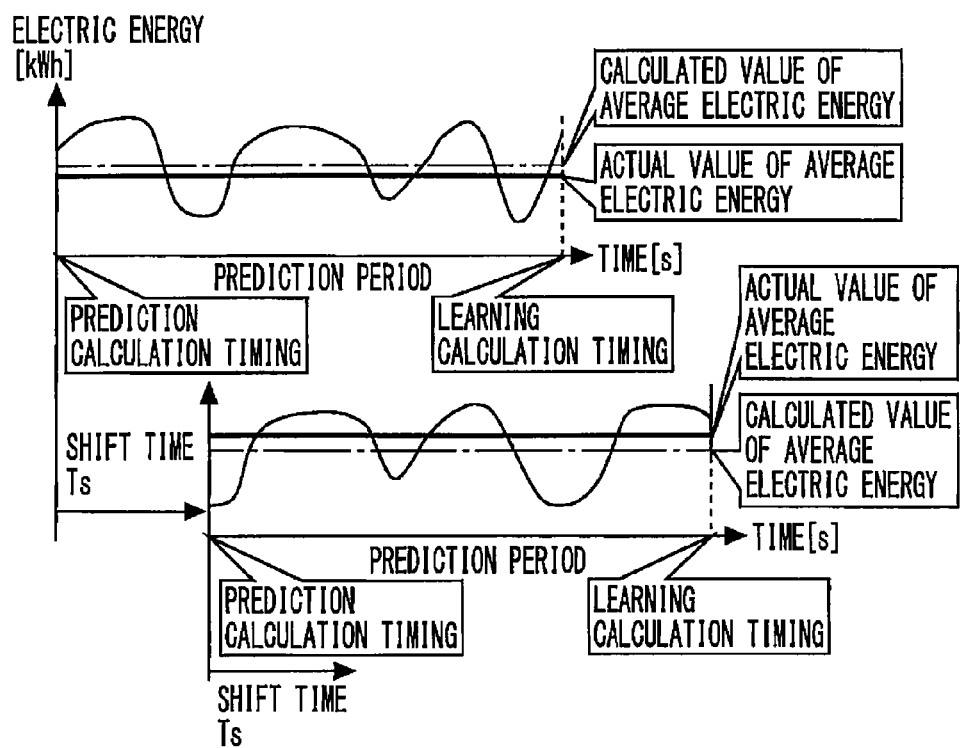
FIG. 10 is a diagram to explain the learning function of the power demand prediction function of the power equalization device in Embodiment 1 of the present invention.

FIG. 10 is a diagram to explain the learning function of the power demand prediction function of the power equalization device in Embodiment 1 of the present invention.

As shown in FIG. 10, the execution of the power demand prediction function 13 is repeated for each shift time $T_s$. The prediction period is 30 minutes to 2 hours or so. Furthermore, because the response of the power system is fast, the shift time $T_s$ is set at 1 second to 1 minute or so. After a prediction calculation at the present time, when a corresponding prediction period is finished, actual data is sampled and a learning calculation is performed. Specifically, learning is performed by making a comparison between an actual value of average electric energy and a calculated value of average electric energy in a prediction period. As with Formula (9), a learning calculation is calculated by Formula (14) below.

(Learned value Z)=(actual value of average electric energy)/(predicted value of average electric energy) (14)

After that, calculations similar to those by Formula (10) and Formula (11) are performed.

Next, with the aid of FIG. 11 a description will be given of a method of equalizing power by the power equalization control function 14.

Figure 11:
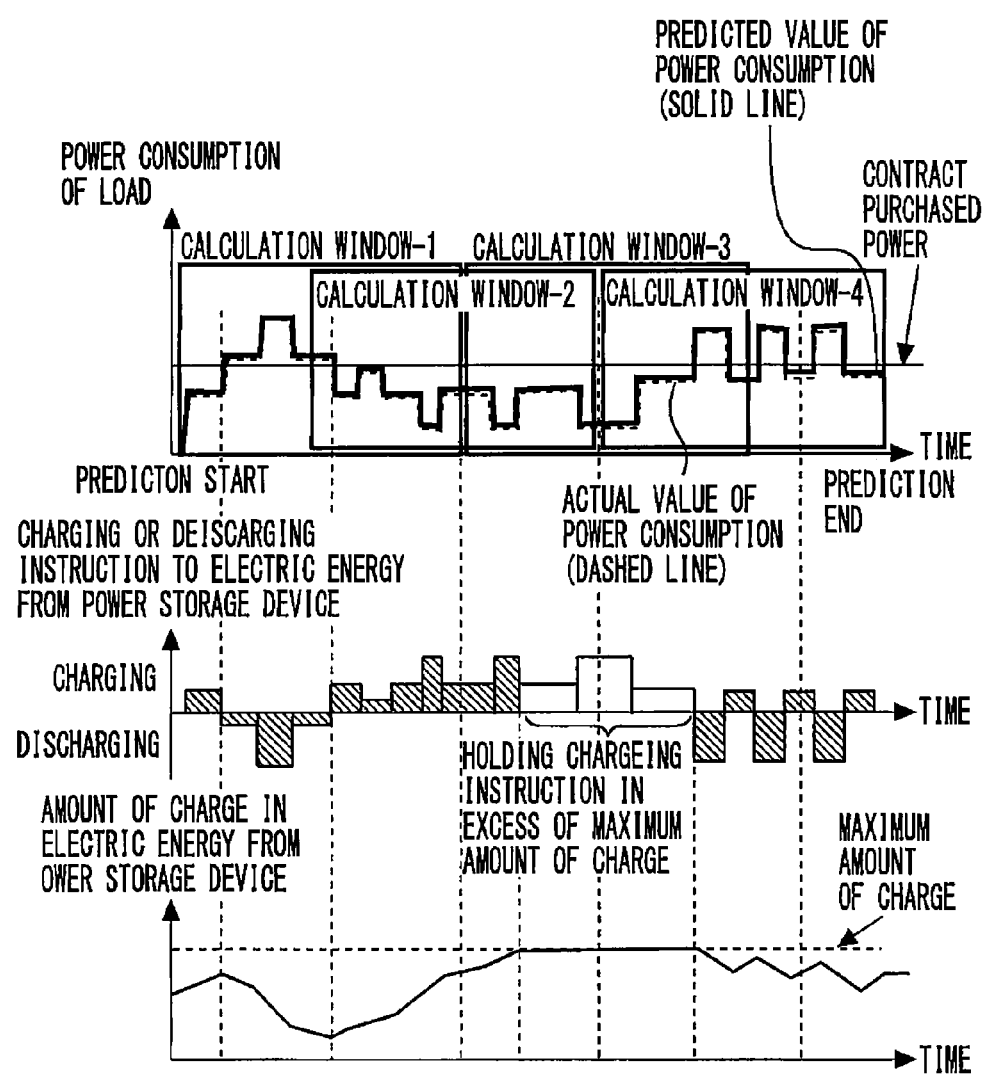
FIG. 11 is a diagram to explain the power equalization control function of the power equalization device in Embodiment 1 of the present invention.

FIG. 11 is a diagram to explain the power equalization control function of the power equalization device in Embodiment 1 of the present invention.

The power equalization control function 14 controls the power storage device 7 using time-series changes in power demand predicted in the power demand prediction function 13 so that the contract purchased power contracted with an electric company and the like is not exceeded. In the case where power consumption exceeds contract purchased power, the power equalization control function 14 performs control to cause the power storage device 7 to perform discharging in good time so that the power required by the rolling line 2 does not become insufficient. In actuality, an allowance is given to contract purchased power, and the above-described measure is taken when predicted power has reached (contract purchased power)-(allowance). In the case where the power storage device 7 continues discharging and the power in the power storage device 7 has been exhausted, power supply from outside becomes necessary.

Charging to the power storage device 7 is performed in the case where that a predicted value of power consumption is below contract purchased power continues. However, there is an upper limit to the capacity of the power storage device 7. For this reason, in the case where the power storage device 7 has become fully charged, the power equalization control function 14 outputs an instruction to stop the charging of the power storage device 7 to the power storage device control function 9.

In performing these calculations, a calculation window is set and the charging and discharging of the power storage device 7 is determined by obtaining time-series changes in power demand in that range. The calculation window is shifted at given time intervals. The shifting of the calculation window may be performed in synchronization with the execution timing of the power demand prediction function 13.

The period of the calculation window is set at not more than a prediction period. Control is performed so that power consumption does not exceed contract purchased power in the range of this calculation window. Furthermore, in order to extend the life of the power storage device 7, a limit to the rate of change in a predicted value of power may sometimes be added so that switching between charging and discharging is not frequently performed.

And in the case where the discharge period of the power storage device 7 is short, setting is performed in such a manner that discharging is performed first from the large-capacity capacitor and the flywheel. In this case, it is possible to reduce the capacity of the storage battery and to reduce the frequency of charging and discharging.

Next, with the aid of FIG. 12 a description will be given of the power monitor control means of the power equalization control function 14.

Figure 12:
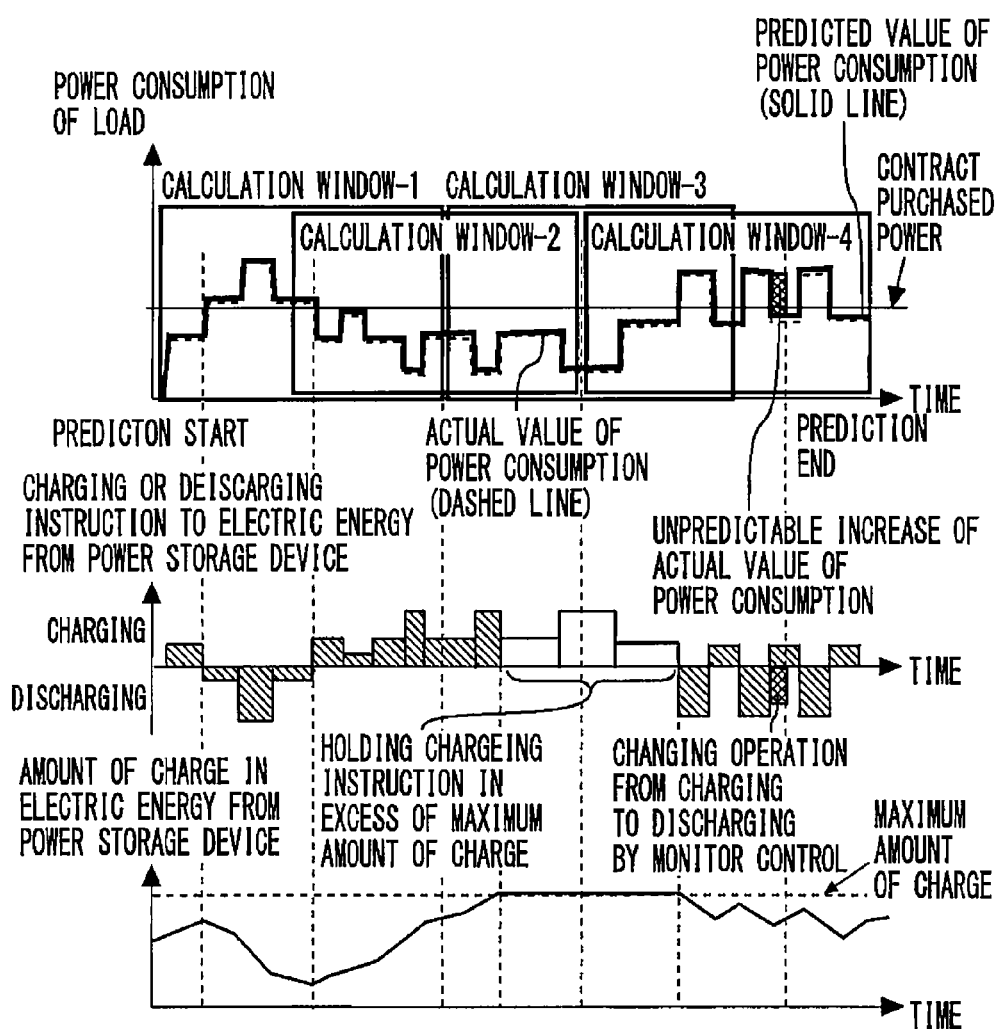
FIG. 12 is a diagram to explain the power monitor control means of the power equalization control function of the power equalization device in Embodiment 1 of the present invention.

FIG. 12 is a diagram to explain the power monitor control means of the power equalization control function of the power equalization device in Embodiment 1 of the present invention.

As in the calculation window-4 of FIG. 12, even in the case where a decrease in power demand was expected, in actuality, power demand may sometimes do not decrease. In this case, the power monitor control means changes the operation of the power storage device 7 from charging to discharging by the monitor control of power demand. For example, in the case where a rapid discharge is necessary, setting is performed in such a manner that discharging is performed from the large-capacity capacitor and the flywheel and that subsequently, discharging is performed from the storage battery, if necessary. In this case, it is possible to cope with a rapid discharge and also a large amount of discharge which follows this rapid discharge.

Next, with the aid of FIG. 13 an outline of the processing within the power equalization device 10 will be given.

Figure 13:
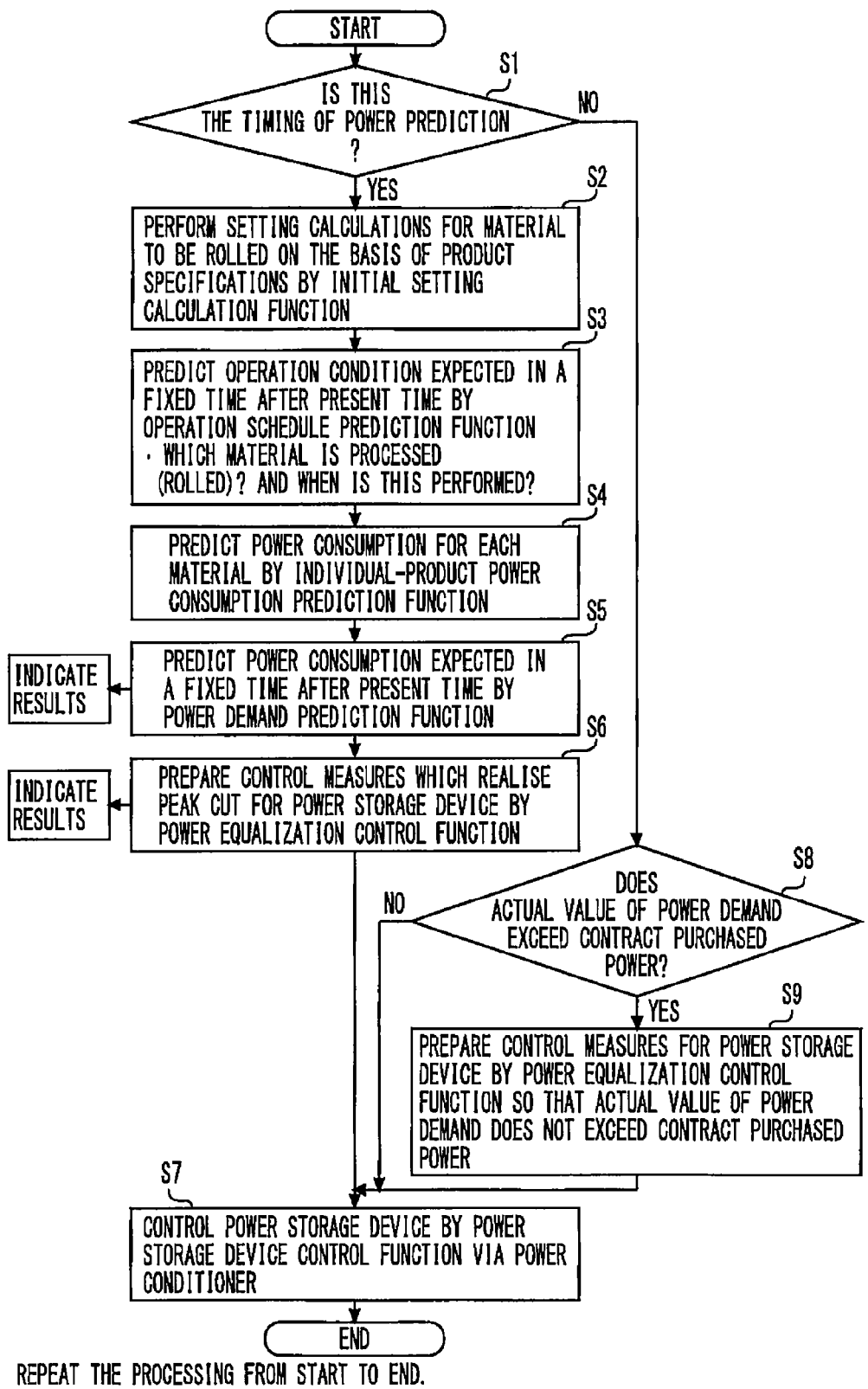
FIG. 13 is a flowchart to explain the processing within the power equalization device in Embodiment 1 of the present invention.

FIG. 13 is a flowchart to explain the processing within the power equalization device in Embodiment 1 of the present invention.

In Step S1, whether this is the timing of power prediction is determined. In the case of the timing of power prediction, the flow of processing proceeds to Step S2. In Step S2, for a material to be rolled, the initial setting calculation function 4 performs setting calculations on the basis of the product specifications 6.

After that, the flow of processing proceeds to Step S3, where the operation schedule prediction function 11 predicts an operation condition expected in a fixed time after the present time. Specifically, prediction is carried out as to which material and at which time production (rolling) is performed. After that, the flow of processing proceeds to Step S4, where the individual-product power consumption prediction function 12 predicts power consumption for each material.

After that, the flow of processing proceeds to Step S5, where the power demand prediction function 13 predicts power consumption in a fixed time after the present time. On this occasion, the indication function 15 causes a display and the like to indicate results. After that, the flow of processing proceeds to Step S6, where the power equalization control function 14 prepares control measures which realise a peak cut for the power storage device 7. On this occasion, the indication function 15 causes the display and the like to indicate results.

After that, the flow of processing proceeds to Step S7, where the power storage device control function 9 controls the power storage device 7 via the power conditioner 8.

In the case where this is not the prediction timing in Step S1, the flow of processing proceeds to Step S8. In Step S8, whether an actual value of power demand exceeds contract purchased power is determined. In the case where an actual value of power demand does not exceed contract purchased power, the flow of processing proceeds to Step S7 and the control of the power storage device 7 is maintained.

In the case where an actual value of power demand exceeds contract purchased power in Step S8, the flow of processing proceeds to Step S9. In Step S9, the power equalization control function 14 prepares control measures for the power storage device 7 so that an actual value of power demand does not exceed contract purchased power. After that, the flow of processing proceeds to Step S7, where the power storage device control function 9 controls the power storage device 7 by the measures via the power conditioner 8.

According to Embodiment 1 described above, the power storage device 7 performs discharging in the case where the power consumption predicted by the power demand prediction function 13 exceeds a prescribed value. For this reason, even in the case where a plurality of materials are simultaneously processed at different locations, it is possible to equalize the power supplied to the manufacturing line from outside. As a result, it is possible to reduce the capacity of power supply equipment. Furthermore, it is also possible to reduce the sizes of power lines of an external power system and the scale of substation equipment. For this reason, it is possible to supply power from outside inexpensively.

In the case where the power consumption predicted by the power demand prediction function 13 does not exceed a prescribed value, the power storage device 7 is charged by receiving power supply from an external power system. For this reason, concerning the charging of the power storage device 7, it is possible to effectively use an external power system.

The order of discharging of the storage battery, the flywheel, and the large-capacity capacitor changes according to the rate of change in power demand. For this reason, it is possible to enhance the characteristics of the power storage device 7.

A predicted value of power consumption is computed on the basis of prediction results of the operation schedule prediction function 11 and the individual power consumption prediction function. For this reason, it is possible to easily find a predicted value of power consumption.

The individual-product power consumption prediction function 12 outputs calculation results of either the model based power consumption computation means 12a or the actual-date based power consumption prediction means 12b. For this reason, it is possible to maintain the equalization of power even when either of the functions becomes faulty.

The operation schedule prediction function 11, the individual-product power consumption prediction function 12, and the power demand prediction function 13 have each a learning function. For this reason, it is possible to increase the accuracy in the equalization of power.

The power storage device 7 performs discharging in the case where an actual value of power supplied from an external power system exceeds a prescribed threshold value. For this reason, it is possible to more accurately equalize the power supplied to the manufacturing line from outside.

Even when the rolling line 2 is a plate rolling mill, the power equalization device 10 can be applied.

Embodiment 2

Figure 14:
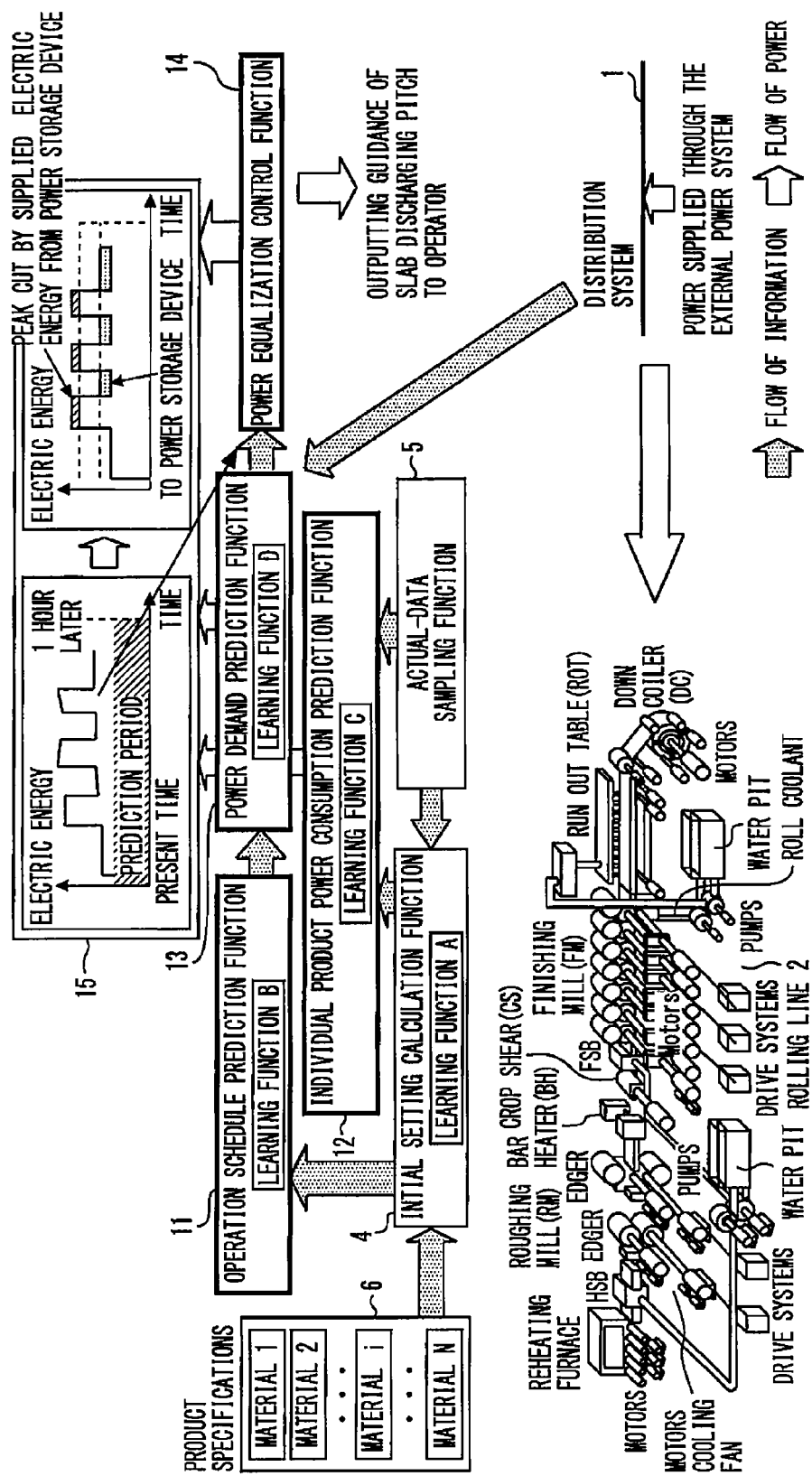
FIG. 14 is a block diagram of a power equalization device in Embodiment 2 of the present invention.

FIG. 14 is a block diagram of a power equalization device in Embodiment 2 of the present invention. Parts which are the same as in Embodiment 1 or corresponding parts bear identical numerals and description of these parts are omitted.

In Embodiment 1, the power storage device 7 is provided. On the other hand, in Embodiment 2, no power storage device 7 is provided.

In this case, the power equalization control function 14 reduces peak power by restricting the rolling pitch. Specifically, the power equalization control function 14 outputs a calculated value of a desired pitch of rolled materials as guidance to an operator. In this case, the operator carries out a reduction of peak power by conforming to this calculated value.

Next, with the aid of FIG. 15 a method of restricting the pitch of rolled materials will be described.

Figure 15:
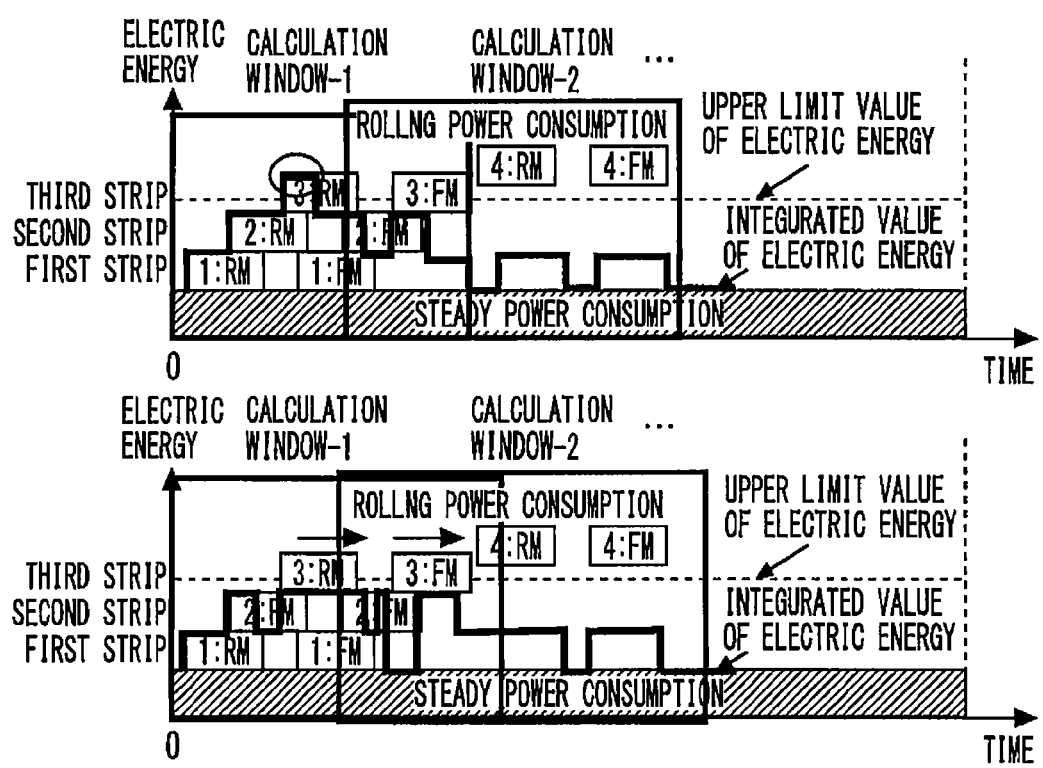
FIG. 15 is a diagram to explain a method of restricting the pitch of rolled materials by the power equalization device in Embodiment 2 of the present invention.

FIG. 15 is a diagram to explain a method of restricting the pitch of rolled materials by the power equalization device in Embodiment 2 of the present invention.

As shown in the upper part of FIG. 15, predicted values of electric energy required by rough rolling and finish rolling are accumulated for rolled materials 1, 2, 3, . . . , which are to be rolled. At this time, when the predicted values of electric energy exceed an upper value of electric energy, as shown in the lower part of FIG. 15, peak power is restricted by delaying the rolling time of the rolled materials. Also in this calculation, a calculation window is set. The rolling time of the rolled materials is determined by obtaining time-series changes in power demand in the range of this calculation window. This calculation window is shifted at given time intervals.

Next, with the aid of FIG. 16 an outline of the processing within the power equalization device 10 will be given.

Figure 16:
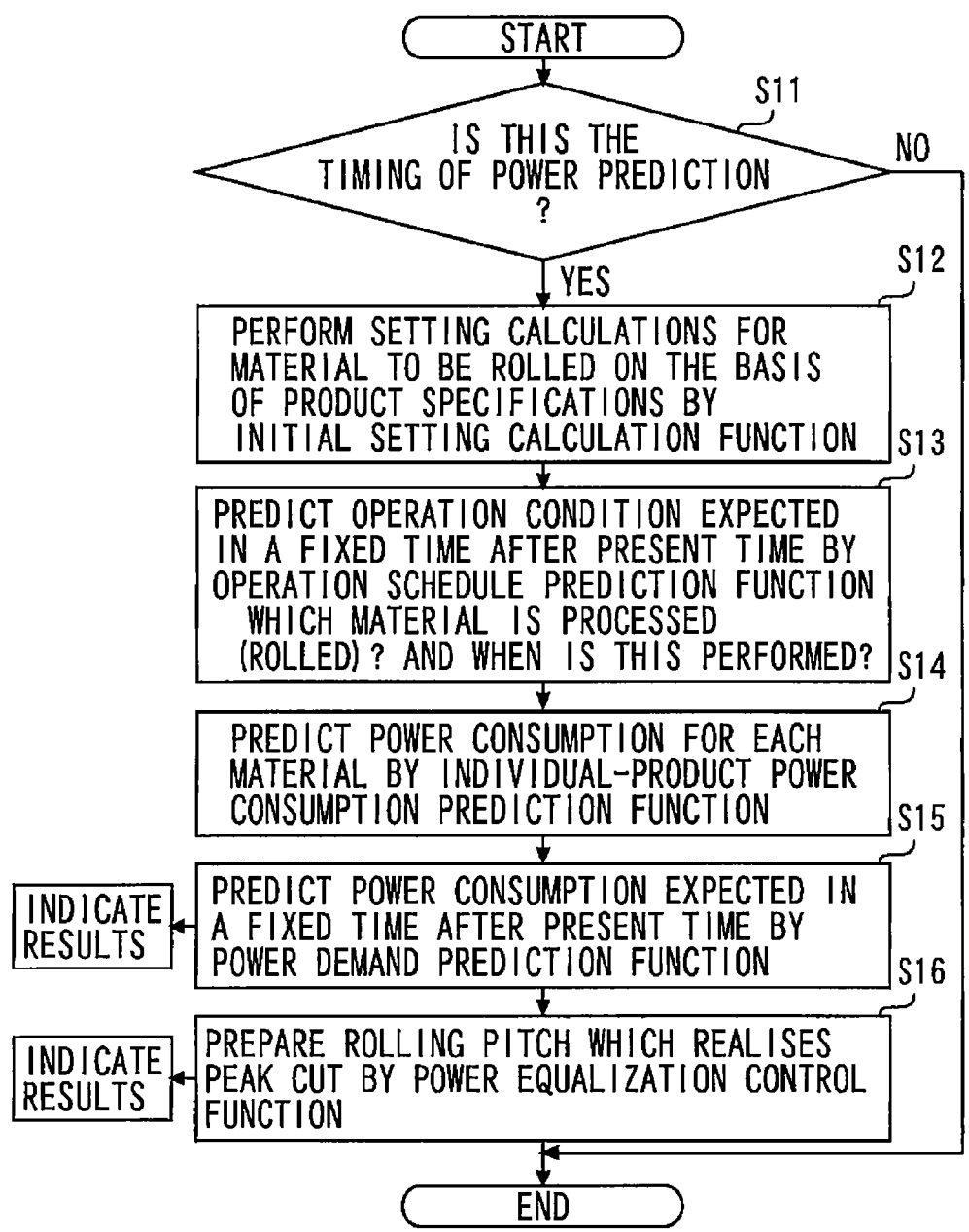
FIG. 16 is a flowchart to explain the processing within the power equalization device in Embodiment 2 of the present invention.

FIG. 16 is a flowchart to explain the processing within the power equalization device in Embodiment 2 of the present invention.

Steps S11 to S15 are the same as Steps S1 to S5 of FIG. 13. After Step S15, the flow of processing proceeds to Step S16.

In Step S16, the power equalization control function 14 prepares the rolling pitch which realises a peak cut of power.

On this occasion, the indication function 15 causes a display and the like to indicate results.

According to Embodiment 2 described above, even in the case where there is no power storage device 7, it is possible to equalize the power supplied to the manufacturing line from outside.

Embodiment 3

Figure 17:
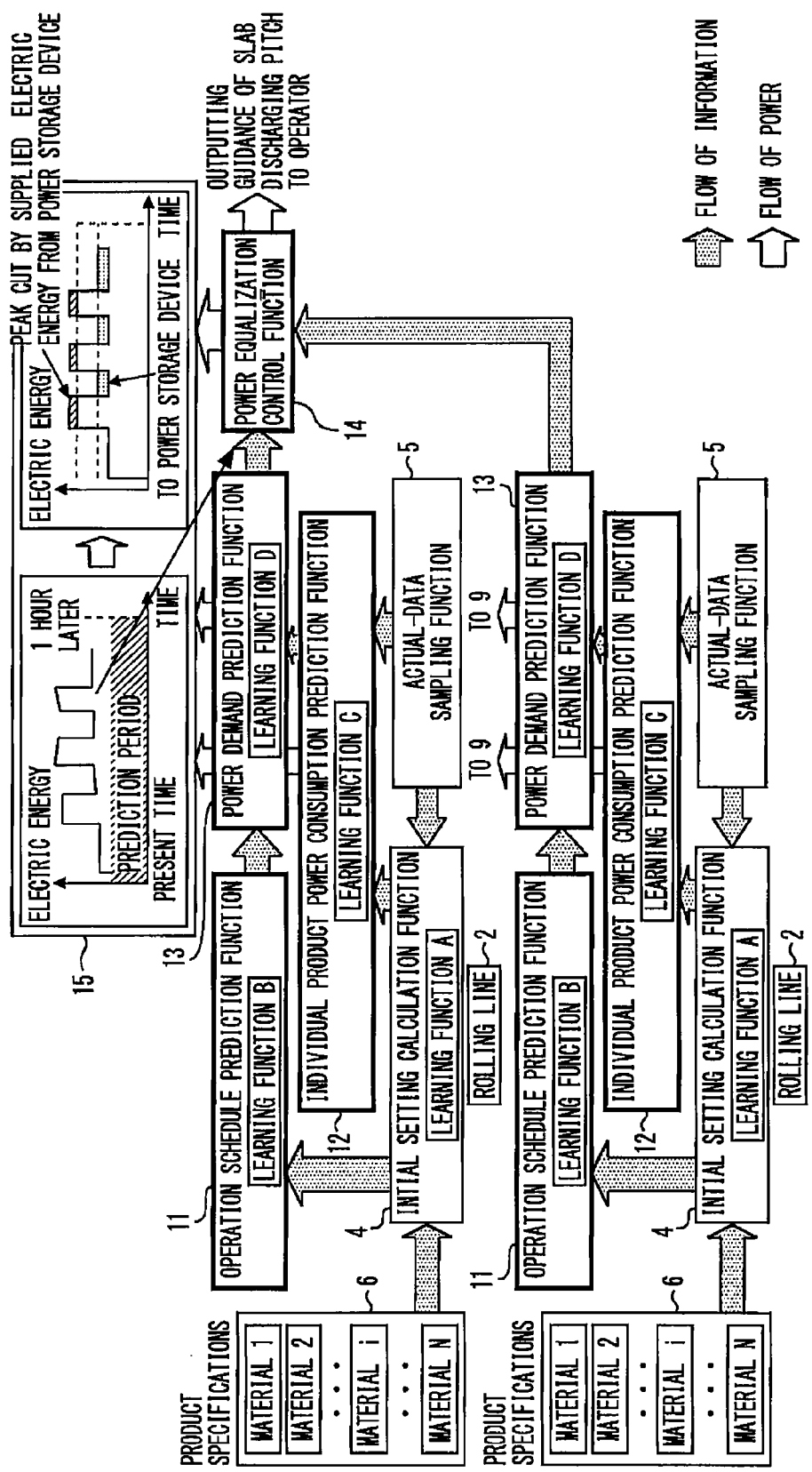
FIG. 17 is a block diagram of a power equalization device in Embodiment 3 of the present invention.

FIG. 17 is a block diagram of a power equalization device in Embodiment 3 of the present invention. Parts which are the same as in Embodiment 1 or corresponding parts bear identical numerals and description of these parts is omitted.

In FIG. 17, two rolling lines 2 are provided. In this case, a power equalization device 10 is provided for each of the rolling lines 2. However, a power equalization control function 14 and an indication function 15 are shared between the plurality of rolling lines 2.

In this case, the power equalization control function 14 adopts prediction results of power consumption by each power demand prediction function 13, arranges power demand in the same manner as in FIG. 15, and rearranges the power demand, thereby equalizing power loads of the two rolling lines 2. Also in the case where there are three or more rolling lines 2, similar control is possible.

According to Embodiment 3 described above, even in the case of a plurality of rolling lines 2, it is possible to equalize the power supplied to the manufacturing lines from outside.

In Embodiment 1, in the case where the power storage device 7 cannot be used due to failures and the like and in the case where the electricity in the power storage device 7 has been used up, the pitch of rolled materials may be restricted as in Embodiment 2.

The power equalization device 10 may be applied to a manufacturing line of a metallic material other than a rolling line 2. Furthermore, the power equalization device 10 may be applied to the whole manufacturing plant including a manufacturing line and the like. Also in these cases, it is possible to equalize the power supplied to a manufacturing line from outside.

INDUSTRIAL APPLICABILITY

As described above, the power equalization device of the present invention can be used in a manufacturing plant or a manufacturing line of a metallic material where a plurality of materials are simultaneously processed.

DESCRIPTION OF SYMBOLS 1 distribution system
2 rolling line
3 control system
4 initial setting calculation function
4a calculation result
5 actual-data sampling function
6 product specification
7 power storage device
8 power conditioner
9 power storage device control function
10 power equalization device
11 operation schedule prediction function
12 individual-product power consumption prediction function
12a model based power consumption computation means
12b actual-data based power consumption prediction means 12c calculation result
13 power demand prediction function
14 power equalization control function
15 indication function

The invention claimed is:

1. A power equalization device, comprising:
a power demand prediction function of predicting power consumption expected when a plurality of materials are processed at different locations of a manufacturing plant or manufacturing line of a metallic material;
a power equalization control function of causing a power storage device to make the manufacturing plant or the manufacturing line perform discharging in the case where power consumption predicted by the power demand prediction function exceeds a prescribed value, so that power supplied to the manufacturing plant or the manufacturing line from an external power system becomes not more than the prescribed value;
an operation schedule prediction function of predicting location and time for manufacturing each of rolled materials in the manufacturing plant or the manufacturing line; and
an individual-product power consumption prediction function of predicting power consumption expected when each of the rolled materials is manufactured at the location,
wherein on the basis of the location of each of the rolled materials at a point of time, the power demand prediction function calculates power consumption expected when each of the rolled materials is manufactured at the point of time, and regards an integrated value of a calculated value of power consumption expected when each of the rolled materials is manufactured as a predicted value of power consumption of the manufacturing plant or the manufacturing line at the point of time, and
wherein the operation schedule prediction function makes a comparison between a predicted value and an actual value of location and time expected or obtained when a rolled material is manufactured in the manufacturing plant or the manufacturing line and improves a prediction accuracy of location and time expected when each of the rolled materials is manufactured.

2. The power equalization device according to claim 1, wherein the power equalization control function causes the power storage device to perform charging by receiving power supply from the external power system in the case where the power consumption predicted by the power demand prediction function does not exceed the prescribed value.

3. The power equalization device according to claim 1, wherein the power equalization control function adjusts the manufacturing timing of a product in the manufacturing plant or the manufacturing line in the case where the power storage device cannot be used, so that power supplied to the manufacturing plant or the manufacturing line from the external power system becomes not more than the prescribed value.

4. The power equalization device according to claim 3, wherein in the case where predicted values of power consumption of a plurality of manufacturing plants or manufacturing lines exceed the prescribed value, the power equalization control function adjusts product manufacturing timing in the plurality of manufacturing plants or manufacturing lines so that power supplied to the plurality of manufacturing plants or manufacturing lines from the external power system becomes not more than the prescribed value.

5. The power equalization device according to claim 1,
wherein the power storage device comprises a plurality of devices with different responses of discharging and
wherein in causing the power storage device to perform discharging to the manufacturing plant or the manufacturing line, the power equalization control function changes an order of devices which are caused to perform discharging according to the rate of change in power demand.

6. The power equalization device according to claim 1, wherein the power demand prediction function makes a comparison between a predicted value and an actual value of the power consumption of the manufacturing plant or the manufacturing line and improves the prediction accuracy of the power consumption of the manufacturing plant or the manufacturing line.

7. The power equalization device according to claim 1, wherein on the basis of set values of the manufacturing plant or the manufacturing line computed so as to meet product specifications given when each of the rolled materials was manufactured in the manufacturing plant or the manufacturing line, the individual-product power consumption prediction function predicts power consumption expected when each of the rolled materials is manufactured at the location.

8. The power equalization device according to claim 1, wherein on the basis of an actual value of power consumption obtained when a rolled material was manufactured in the manufacturing plant or the manufacturing line, the individual-product power consumption prediction function predicts power consumption expected when each of the rolled materials is manufactured at the location.

9. The power equalization device according to claim 1, wherein the individual-product power consumption prediction function makes a comparison between a predicted value and an actual value of power consumption expected or obtained when a rolled material is manufactured at the location in the manufacturing plant or the manufacturing line, and improves the prediction accuracy of power consumption expected when each of the rolled materials is manufactured at the location.

10. The power equalization device according to claim 1, wherein in the case where an actual value of power supplied to the manufacturing plant or the manufacturing line from the external power system exceeds a threshold value set at a value not more than the prescribed value, the power equalization control function causes the power storage device to perform discharging to the manufacturing plant or the manufacturing line.

11. A power equalization device, comprising:
processing circuitry configured to
predict power consumption expected when a plurality of materials are processed at different locations of a manufacturing plant or manufacturing line of a metallic material,
cause a power storage device to make the manufacturing plant or the manufacturing line perform discharging in the case where predicted power consumption exceeds a prescribed value, so that power supplied to the manufacturing plant or the manufacturing line from an external power system does not become more than the prescribed value,
predict location and time for manufacturing each of rolled materials in the manufacturing plant or the manufacturing line, predict power consumption expected when each of the rolled materials is manufactured at the location, calculate, on the basis of the location of each of the rolled materials at a point of time, power consumption expected when each of the rolled materials is manufactured at the point of time, and regard an integrated value of a calculated value of power consumption expected when each of the rolled materials is manufactured as a predicted value of power consumption of the manufacturing plant or the manufacturing line at the point of time, and make a comparison between a predicted value and an actual value of location and time expected or obtained when a rolled material is manufactured in the manufacturing plant or the manufacturing line and improves a prediction accuracy of location and time expected when each of the rolled materials is manufactured.

12. The power equalization device according to claim 11, wherein the processing circuitry adjusts the manufacturing timing of a product in the manufacturing plant or the manufacturing line in the case where the power storage device cannot be used, so that power supplied to the manufacturing plant or the manufacturing line from the external power system does not become more than the prescribed value.

13. The power equalization device according to claim 11, wherein the processing circuitry makes a comparison between a predicted value and an actual value of the power consumption of the manufacturing plant or the manufacturing line and improves the prediction accuracy of the power consumption of the manufacturing plant or the manufacturing line.

14. The power equalization device according to claim 11, wherein on the basis of set values of the manufacturing plant or the manufacturing line computed so as to meet product specifications given when each of the rolled materials was manufactured in the manufacturing plant or the manufacturing line, the processing circuitry predicts power consumption expected when each of the rolled materials is manufactured at the location.

15. The power equalization device according to claim 11, wherein the processing circuitry makes a comparison between a predicted value and an actual value of power consumption expected or obtained when a rolled material is manufactured at the location in the manufacturing plant or the manufacturing line, and improves the prediction accuracy of power consumption expected when each of the rolled materials is manufactured at the location.

16. The power equalization device according to claim 11, wherein in the case where an actual value of power supplied to the manufacturing plant or the manufacturing line from the external power system exceeds a threshold value set at a value not more than the prescribed value, the processing circuitry causes the power storage device to perform discharging to the manufacturing plant or the manufacturing line.

17. A power equalization method, comprising:

predicting power consumption expected when a plurality of materials are processed at different locations of a manufacturing plant or manufacturing line of a metallic material;

causing, via processing circuitry, a power storage device to make the manufacturing plant or the manufacturing line perform discharging in the case where predicted power consumption exceeds a prescribed value, so that power supplied to the manufacturing plant or the manufacturing line from an external power system does not become more than the prescribed value;

predicting, via processing circuitry, location and time for manufacturing each of rolled materials in the manufacturing plant or the manufacturing line;

predicting, via the processing circuitry, power consumption expected when each of the rolled materials is manufactured at the location;

calculating, via the processing circuitry and on the basis of the location of each of the rolled materials at a point of time, power consumption expected when each of the rolled materials is manufactured at the point of time, and regarding an integrated value of a calculated value of power consumption expected when each of the rolled materials is manufactured as a predicted value of power consumption of the manufacturing plant or the manufacturing line at the point of time; and making a comparison between a predicted value and an actual value of location and time expected or obtained when a rolled material is manufactured in the manufacturing plant or the manufacturing line and improves a prediction accuracy of location and time expected when each of the rolled materials is manufactured.

* * * * *